United States Patent [19]

Olk

[11] Patent Number: 5,753,088
[45] Date of Patent: May 19, 1998

[54] METHOD FOR MAKING CARBON NANOTUBES

[75] Inventor: Charles Howard Olk, Leonard, Mich.

[73] Assignee: General Motors Corporation, Detroit, Mich.

[21] Appl. No.: 801,675

[22] Filed: Feb. 18, 1997

[51] Int. Cl.$^6$ .................................................. C01B 31/00
[52] U.S. Cl. .................. 204/173; 423/445 R; 423/445 B
[58] Field of Search ...................... 204/173; 423/445 R, 423/445 B

[56] References Cited

U.S. PATENT DOCUMENTS

| | | | |
|---|---|---|---|
| 5,227,038 | 7/1993 | Smalley et al. | 204/173 |
| 5,482,601 | 1/1996 | Ohshima et al. | 204/173 |
| 5,534,232 | 7/1996 | Denes et al. | 422/186.26 |
| 5,648,056 | 7/1997 | Tanaka | 423/445 B |

OTHER PUBLICATIONS

Ebbesen, "Carbon Nanotubes", *Annu. Rev. Mater. Sci.* 1994, vol. 24, pp. 235–264. Month not available.
Ebbesen, "Carbon Nanotubes", *Physics Today*, Jun. 1996, pp. 26–32.
Ebbesen et al, "Large–Scale Synthesis of Carbon Nanotubes", *Nature*, vol. 358, 16 Jul. 1992, pp. 220–222.
Iijima, "Helical Microtubules of Graphitic Carbon", *Nature*, vol. 354, 7 Nov. 1991, pp. 56–58.

*Primary Examiner*—Kathryn L. Gorgos
*Assistant Examiner*—Kishor Mayekar
*Attorney, Agent, or Firm*—George A. Grove

[57] ABSTRACT

Carbon nanotubes are produced by submerging carbonaceous anode and cathode electrodes in liquid nitrogen or other suitable liquefied materials such as helium or hydrogen, and passing a direct current between the electrodes to strike a plasma arc between the anode and cathode that erodes carbon from the anode and deposits carbon nanotubes on the surface of the cathode.

4 Claims, 1 Drawing Sheet

METHOD FOR MAKING CARBON NANOTUBES

BACKGROUND OF THE INVENTION

In 1991, Sumio Iijima described his synthesis of $C_{60}$ fullerene structures in the form of needle-like multilayer tubes having nanometer dimensions. These extended fullerene tube structures have been called carbon nanotubes. Structurally, carbon nanotubes are an extended member of a new class of molecular carbons known as fullerenes. The atomic arrangement of the hexagonal carbon ring relative to the nanotube axis varies from tube to tube and is usually helical. The tube ends have been shown at times to terminate as $C_{60}$ hemispheres for the smallest diameters, and as cones containing five pentagons or cylinders containing six pentagons. The nanotubes are composed of a number of concentric cylindrical sheets (ranging from one to approximately 50) of hexagonally-arranged carbon atoms. The tubes typically have a diameter of a few to a few tens of nanometers and a length of up to a few micrometers.

Carbon nanotubes are of a considerable interest because of their cage-like structure and because they may be synthesized or prepared to contain other atoms or molecules.

The synthesis of these nanotubes in experimental quantities using a standard carbon arc method has been accomplished for several years. Production of nanotubes typically consists of placing two water-cooled carbon electrodes of amorphous carbon or graphite rods approximately one millimeter apart within a vacuum chamber, evacuating the chamber to a pressure of approximately $10^{-7}$ torr, backfilling the chamber with an inert gas such as helium, nitrogen, argon or hydrogen to pressures ranging from approximately 50 to 500 torr, striking a high current electrical arc between the electrodes while continually adjusting them to maintain the one millimeter electrode gap. In this process, the ability to create an inert gas atmosphere is essential. The result is a growth of carbon nanotubes and other small carbon particles on the negative electrode. The quantity of nanotubes produced in the electrode deposits depends on how long optimum growth conditions can be maintained.

In such experimental setups, a DC voltage of about 18V is applied between two carbon electrodes in a chamber under about 500 torr of helium. A plasma forms between the closely-spaced electrodes. Carbon accumulates on the negative electrode and grows as the positive electrode is consumed. When the correct electrode spacing is maintained, the deposit grows into a cylindrical structure with an outer hard shell and an inner soft fibrous core. The gray outer shell is composed of carbon nanotubes and other carbon nanoparticles fused into a hard mass, probably due to excessive current passing through it. The soft black inner core contains free nanotubes and nanoparticles in the form of fibers where the fibers are aligned with the direction of current flow between the electrodes.

In order to produce any substantial number of carbon nanotubes, it is a typical practice to employ a larger diameter graphite rod as the cathode and a relatively smaller diameter graphite rod as the anode. Initially, at least, the electrodes have flat and parallel opposing faces. Since the anode rod is consumed as the arc discharge proceeds, one of the electrodes must be moved to displace a constant gap. Furthermore, it is desirable to move the anode with respect to the cathode so as to expose a fresh surface for deposition of the nanosize particle products. U.S. Pat. No. 5,482,601 to Oshima et al, for example, describes a mechanism for the production of carbon nanotubes in an inert gas-containing chamber. The complicated mechanism is required to position the two electrodes in the chamber and move them with respect to each other as the DC arc causes the production of the carbon nanotubes. As disclosed, it is also desirable to provide a scraper to shear the deposited nanotubes and other nanoparticles from the surface of the cathode. All of this is to be accomplished without altering the pressure of the inert gas in the chamber and while maintaining a suitable gap between the electrodes for the production of the plasma and the deposition of the carbon nanotubes.

Obviously, it is desirable to simplify the production arrangement for the production of nanotubes by the electric arc discharge method so that the movement of the cathode and anode can be simplified. In other words, it is desirable to do away with the inert gas chamber.

SUMMARY OF THE INVENTION

This invention provides a process for the production of carbon nanotubes in which the use of an inert gas chamber is avoided. In accordance with the practice of the invention, the electrodes themselves are immersed in liquid nitrogen or other suitable liquid inert material such as liquid argon. An arc is produced between the submerged electrodes and the submerged plasma effects nanotube production just as in an inert gas chamber. While the electrode themselves are immersed in the liquid nitrogen, the mechanism for controlling the position of the electrodes can be situated in air above the level of liquid nitrogen to vastly simplify the production of the carbon nanotubes.

BRIEF DESCRIPTION OF THE DRAWINGS

Other objects and advantages of the present invention will become apparent from a detailed description of preferred embodiments of the invention which follows. Reference will be had to the accompanying drawings in which.

DESCRIPTION OF THE PREFERRED EMBODIMENTS

Figure 1:
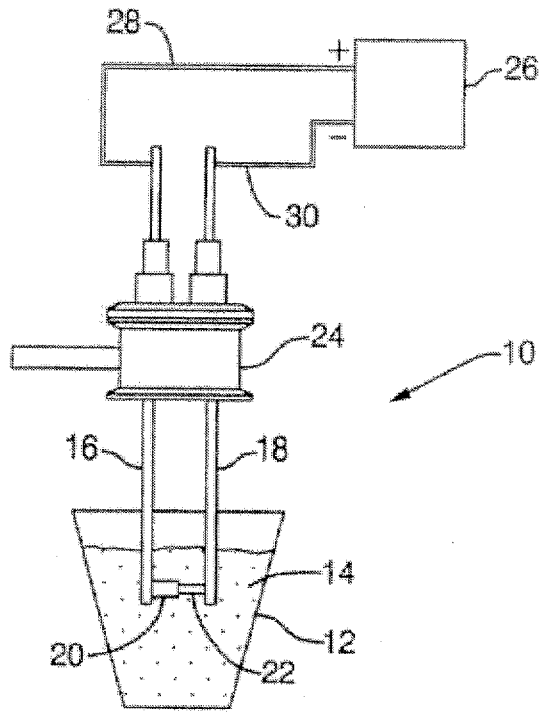
FIG. 1 is a schematic illustration of an apparatus for the production of carbon nanotubes according to the present invention.

FIG. 1 is a schematic illustration of apparatus suitable for the practice of the process of this invention. The apparatus is indicated generally at 10. The apparatus 10 comprises a suitably insulated vessel 12 adapted to contain liquid nitrogen 14 (or liquid hydrogen, liquid helium or the like) in which the nanotube growth process will take place. Immersed in the liquid nitrogen 14 are two copper feed through rods 16 and 18 which respectively carry carbon cathode electrode 20 and carbon anode electrode 22. Power supply 26 in a specific example was a Miller XMT200 DC inverter. Positive lead 28 from power supply 26 is connected to the cathode bearing feed through rod 16, and negative lead 30 is connected to the anode bearing feed through rod 18.

Carbon nanotubes were prepared using homogeneous graphite electrode rod bodies as anode 22 and cathode 20. The cathodes 20 in all tests were cylinders six millimeters in diameter, and the anodes 22 were cylinders four millimeters in diameter. The electrode cylinders 20, 22 were connected to their respective copper feed through rods 16, 18 and positioned using a feed through assembly 24 so that the top flat surfaces of the electrodes 20, 22 were substantially parallel and approximately one millimeter apart. The feed through assembly 24 was then clamped in position for experimental production of the carbon nanotubes. Obviously, in a more high volume production effort, the electrodes will be suspended on adjustable mechanisms for maintaining a suitable positional relationship between the electrode surfaces.

The high breakdown voltage necessary to initiate the plasma in the liquid nitrogen was supplied by a Miller high frequency arc starter. In a first experiment, the arc was sustained between the electrodes for approximately 10 seconds at a DC voltage of about 18 volts and a current of 80 amperes. The high temperature plasma created in the arc resulted in a submerged inert nitrogen atmosphere being created around the electrode ends in the liquid nitrogen, thus facilitating the growth.

Carbon nanotubes and carbon polyhedra were produced on the cathode 20 in the bath of liquid nitrogen. Nanotubes and nanoparticles form within the inert nitrogen environment at the center of the negative electrode 20 by deposition of carbon vaporized at the anode 22. A typical carbon growth on such a cathode submerged in liquid nitrogen is substantially the same as that produced by the electric arc process in inert gas-containing chambers. The growth on the cathode electrode displays three distinct concentric regions of growth: an inner black soft and fibrous core containing the nanotubes and nanoparticles, a ring of hard material with a gray metallic appearance composed of fused nanotubes and nanoparticles, and a dark gray soot that covers the remainder of the electrode face. The inner core grows with a majority of nanotubes that have formed with the tube axes aligned parallel to the plasma arc. The micromorphology of the nanotubes is fractal-like in nature in that the growth is composed of bundles of microbundles of nanotubes. The bundles and microbundles of tubes are sometimes cable-like and display a twist along the long axis. The examination of the tubes by electron microscopy shows tubes and bundles of tubes possessing nanometer (30 to 80 nanometers) diameters and micrometer lengths.

Figure 2:
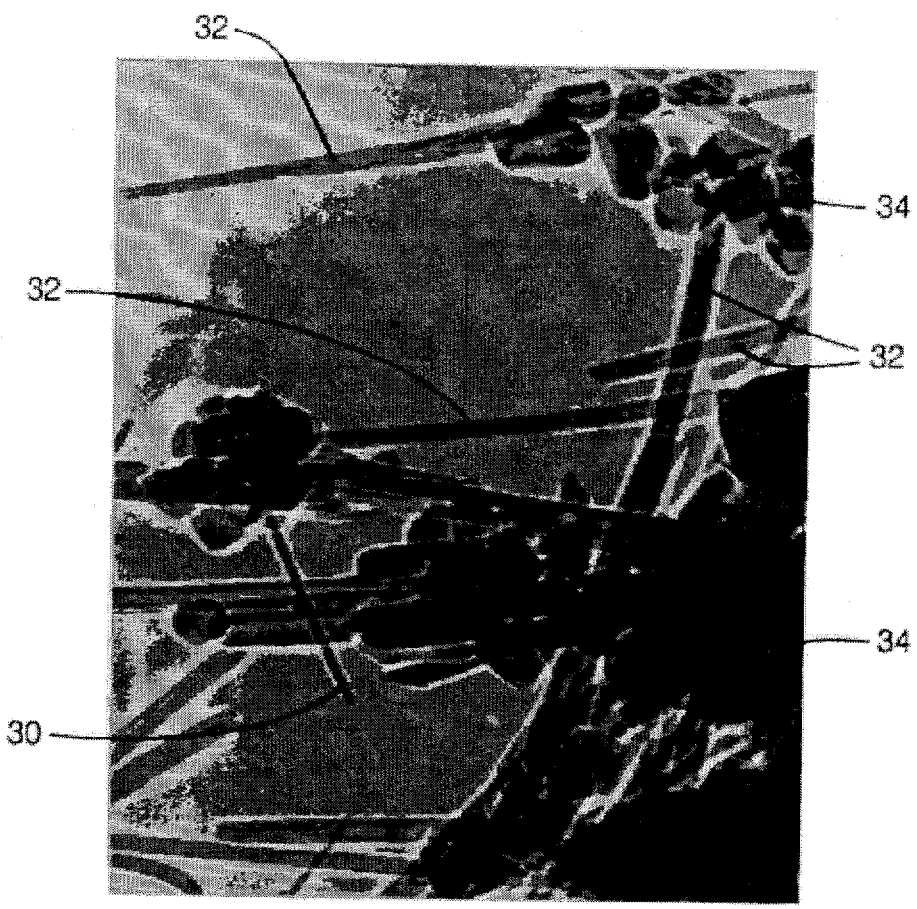
FIG. 2 is a transmission electron micrograph (TEM) that shows the carbon nanotubes and polyhedra produced and described by the subject method. The scale is: one centimeter is approximately 80 nanometers.

FIG. 2 is a transmission electron photograph of the carbon nanotubes and polyhedra produced by the described arc discharge in a liquid nitrogen bath. The moderately magnified TEM image was prepared by scraping material from the core of the cathode onto lacy-carbon coated copper TEM grids. This technique results in an ample abundance of nanotubes and nanoparticles that hang over the holes in the coated grids to facilitate examination in the transmission electron microscopy procedure. The true nature of the fibers becomes apparent in the transmission mode of examination.

An eight-layer nanotube is illustrated at 30 in FIG. 2. Other nanotubes are seen at 32. Carbon nanopolyhydra are indicated at 34.

The subject method produces carbon nanotubes like those produced by the prior art arc discharge practice carried out in inert gas containing chamber. However, the subject growth process is more efficient and practical in that it eliminates the time spent in evacuating such a chamber and backfilling it with inert gas. It also simplifies the handling and maneuvering of the electrodes. No seal or pass through mechanism into an inert gas chamber is required. Further, no vacuum chamber equipment and vacuum pump equipment is necessary for the practice of the subject process, and it is not necessary to meter inert gas.

It is also known that the anode may be modified to contain metals that are to be entrained in nanotubes produced by the electrical discharge process. The same practices may be utilized in accordance with the subject process in which liquid nitrogen or other suitable liquid is employed.

Thus, it is apparent that this process represents a more efficient practice and means for the inert gas chamber discharge process for the production of nanotubes. While the practice has been described in terms of a few specific embodiments thereof, it will be appreciated that other forms could readily be adapted by those skilled in the art. Accordingly, the scope of this invention is intended to be limited only by the following claims.

I claim:

1. A method of making carbon nanotubes comprising immersing at least two carbonaceous electrodes in a liquefied gas and placing said electrodes in closely spaced-apart opposing positions with one electrode adapted to serve as a cathode and the other electrode as an anode in a DC electrical circuit and striking an electrical arc between the electrodes to produce and deposit carbon nanotubes on the cathode.

2. A method of making carbon nanotubes as recited in claim 1 in which said electrodes are immersed in liquid nitrogen.

3. A method of making carbon nanotubes as recited in claim 2 where said cathode and anode are spaced about one millimeter apart and a voltage of about 18 volts is impressed across said electrodes.

4. A method of making carbon nanotubes as recited in any of claims 1 through 3 in which each of said electrodes has a substantially planar surface facing the opposing portion of the other electrode and the area of said surface of said cathode is greater than the area of said surface of said anode.

* * * * *